United States Patent Office 3,029,224
Patented Apr. 10, 1962

3,029,224
PROCESS FOR STABILIZING POLYOLEFINS
Arnold Fischer and Hans-Joachim Lenz, Frankfurt am Main, Germany, assignors to Farbwerke Hoechst Aktiengesellschaft vormals Meister Lucius & Brüning, Frankfurt am Main, Germany, a corporation of Germany
No Drawing. Filed Aug. 5, 1958, Ser. No. 753,190
Claims priority, application Germany Aug. 8, 1957
7 Claims. (Cl. 260—45.75)

The present invention relates to a process for improving polyolefins.

It is known that a number of organic compounds, such as phenols, amines and compounds containing sulfur, are capable of rendering polyethylene and other saturated and unsaturated hydrocarbons of high molecular weight stable to oxidation.

The present invention provides a process for stabilizing a polyolefin of high molecular weight by adding to the polyolefin a two-component stabilization system comprising a compound of a bivalent to hexavalent metal and an element of main group VI of the periodic table having a positive or negative valency and a known organic stabilizer. Zinc sulfide in admixture with such as known stabilizer is particularly suitable for carrying out the stabilization according to the present invention. Besides the sulfides, the selenides and tellurides of metals of sub-group II of the periodic table are applicable to the stabilization according to the invention.

The present invention has the unexpected effect that the two components, for example metallic sulfide and organic stabilizer, are capable of rendering polyolefins stable to oxidation to a degree that has not yet been achieved, whereas the efficiency of each of the two components taken alone is far inferior to the efficiency of the combination according to the invention. Another unexpected feature of the invention is that even at very high processing temperatures, for example 300 to 350° C., the high degree of stabilization obtained with the use of the combination according to the invention is not only maintained but in certain cases even increased. Moreover, the stability to light of the polymers stabilized according to the present invention is increased.

The quantity of the total stabilizer, for example a sulfide plus another stabilizer, amounts to 0.5 to 5% of the quantity of the polymer. If the quantity of total stabilizer admixed with the polyolefins amounts to more than 5%, the effect obtained is not considerably better. Nor is a better effect obtained if the quantity of total stabilizer admixed with the polyolefins is less than 0.5%, calculated on the polymer.

The ratio of the quantity of, for example, sulfides to the quantity of the other stabilizers is in the range of 1 to 500:1.

As compounds utilizable according to the invention there may be mentioned by way of example zinc sulfide, antimony trisulfide, cadmium sulfide, molybdenum sulfide, cadmium selenide, cadmium sulfide selenide (CdS.CdSe), and tin-IV-sulfide ($SnS_2$).

As examples of other known stabilizers that may be used in admixture with the aforesaid inorganic compounds there may be mentioned:

(1) Di-β-naphthyl-p-phenylene diamine,
(2) Di-tertiary-butyl-p-cresol,
(3) Di-β-naphthol,
(4) The condensation product from nonyl, phenol and an organic compound containing a carbonyl group, especially acetone,
(5) Isobornylated o-cresol 85% of which have been hydrogenized.

The present invention is directed to the stabilization of polyolefins, such as polyethylene, polypropylene, polybutene, and copolymers thereof. The aforesaid polymers may have been prepared by the known high pressure process or preferably by the known low pressure process, for example the Ziegler process.

Low pressure processes of this kind are described by Raff and Allison in "Polyethylene," 1956, pages 72 to 81, especially pages 77 to 81.

The following examples serve to illustrate the invention but they are not intended to limit it thereto, the parts being by weight.

Example 1

0.05 part of mercaptobenzimidazole were mixed with 1.5 parts of zinc sulfide and 100 parts of pulverulent linear polyethylene. The mixture so obtained was formed by extrusion into a ribbon which was then granulated. The granulate was worked up into shaped articles by injection molding carried out in one case at 220° C. and in another case at 310° C. When the shaped articles were tempered at 120° C. with access of air, the articles that had been worked up at a temperature of 220° C. exhibited a drop in their mechanical properties after 42 days whereas the articles worked up at 310° C. exhibited such a deterioration only after 54 days. When no zinc sulfide was admixed with the polyethylene, that is to say when the polyethylene was stabilized only with the above-mentioned quantity of organic stabilizer, and when the treatment was carried out under the aforesaid conditions the shaped articles that had been injection-molded at 220° C. exhibited a drop in their mechanical properties after 18 days already whereas the shaped articles injection-molded at 310° C. exhibited a drop in their mechanical properties after 13 days.

Example 2

100 parts of linear polyethylene were intimately mixed on heated rolls with 0.1 part of N-stearoyl-p-aminophenol and 2 parts of antimony trisulfide. The mixture so obtained was compressed at 180° C. to form plates 1 mm. thick. When tempered at 120° C. with access of air, the plates became brittle after 140 days. When pressed plates 1 mm. thick were prepared in the way described above but stabilized only with 0.1% of N-stearoyl-p-aminophenol, the tough-resilient character of the material was lost after 38 days already. When the plates were exposed to light in an Atlas fadeometer it could be seen that the samples that had been stabilized with antimony trisulfide and N-stearoyl-p-aminophenol began to become brittle after 450 hours whereas the samples that had been stabilized only with N-stearoyl-p-aminophenol and without the addition of antimony trisulfide, exhibited a drop in their mechanical properties after 250 hours already.

Example 3

Pulverulent linear polyethylene was mixed with the additions indicated in the table given below, worked up by extrusion and granulated. The granulate so obtained was made into shaped articles by injection molding at various temperatures. The shaped articles thus obtained were tempered at 120° C. with access of air and their brittletime was determined. The walls of the articles had a thickness of 1 mm. The results of this experiment are indicated in the table.

| Substances added | Temperature of injection molding, °C | Brittle-time, days |
|---|---|---|
| none | 200 | 1 |
|  | 310 | 1 |
| 0.04% of 4,4'-thio-bis-[(6-tert.-butyl)-m-cresol] | 200 | 21 |
|  | 310 | 14 |
| 0.04% of 4,4'-thio-bis-[(6-tert.-butyl)-m-cresol]+1% of ZnS | 200 | 39 |
|  | 260 | 50 |
|  | 310 | 57 |
| 0.04% of 4,4'-thio-bis-[(6-tert.-butyl)-m-cresol]+2% of ZnS | 200 | 54 |
|  | 260 | 56 |
|  | 310 | 61 |
| 0.04% of 4,4'-thio-bis-[(6-tert.-butyl)-m-cresol]+2% of CdSe | 200 | 39 |
|  | 60 | 47 |

*Example 4*

100 parts of pulverulent isotactic polypropylene were mixed with 0.5% of N-stearoyl-p-aminophenol and 2% of zinc sulfide. The mixture so obtained was worked up into pressed plates which were tempered at 120° C. Whereas the unstabilized material became brittle after one day at 120° C. and the material stabilized with 0.5% of N-stearoyl-p-aminophenol became brittle after 40 days' storage, the material stabilized with addition of the above-mentioned substances retained its tough-resilient character even after 70 days.

We claim:

1. In the process of stabilizing a polymer of an olefin having 2–3 carbon atoms against thermooxidative decomposition, the step which comprises adding to said polymer a two-component stabilization system comprising a compound selected from the group consisting of zinc sulfide, antimony trisulfide, cadmium sulfide, cadmium selenide, cadmium sulfide selenide and stannic disulfide and an organic stabilizer selected from the group consisting of N-stearoyl-p-aminophenol, 4,4'-thio-bis-[(6-tert.-butyl)-m-cresol] and a condensation product prepared from nonyl-phenol and acetone.

2. In the process of claim 1 the step which comprises adding zinc sulfide in admixture with another organic stabilizer to the polyolefin.

3. In the process of claim 1 the step which comprises adding zinc sulfide in admixture with 4,4'-thio-bis-[(6-tert.-butyl)-m-cresol] to the polyolefin.

4. A process as claimed in claim 1, wherein the total quantity of the stabilizer amounts to between 0.5 and 5% of the polymer.

5. In the process of claim 1 the step which comprises stabilizing low pressure polyethylene.

6. In the process of claim 1 the step which comprises stabilizing low pressure polypropylene.

7. In the process of claim 1 the step which comprises stabilizing a copolymer of ethylene and propylene prepared by the low pressure process.

References Cited in the file of this patent

UNITED STATES PATENTS

| 2,727,979 | Vincent | Dec. 20, 1955 |
| 2,830,034 | Rundquist | Apr. 8, 1958 |

FOREIGN PATENTS

| 772,938 | Great Britain | Apr. 17, 1957 |

OTHER REFERENCES

Condensed Chemical Dictionary, fifth edition, pages 198 and 199, Reinhold Pub. New York, copyright 1956.